United States Patent
Datcuk, Jr.

(10) Patent No.: US 6,830,208 B2
(45) Date of Patent: Dec. 14, 2004

(54) GEAR SHIFT MECHANISM FOR FISHING REEL

(75) Inventor: Peter T. Datcuk, Jr., Sewell, NJ (US)

(73) Assignee: Penn Fishing Tackle Mfg. Co., Phialdelphia, PA (US)

( * ) Notice: Subject to any disclaimer, the term of this patent is extended or adjusted under 35 U.S.C. 154(b) by 18 days.

(21) Appl. No.: 10/427,313

(22) Filed: May 1, 2003

(65) Prior Publication Data

US 2003/0230659 A1 Dec. 18, 2003

Related U.S. Application Data

(60) Provisional application No. 60/390,687, filed on Jun. 18, 2002.

(51) Int. Cl.[7] .............................................. A01K 89/00
(52) U.S. Cl. .................... 242/255; 242/263; 192/48.91; 74/371; 74/372
(58) Field of Search ................................ 242/255, 257, 242/259, 263; 192/48.91, 96; 74/371, 372

(56) References Cited

U.S. PATENT DOCUMENTS

| | | | | |
|---|---|---|---|---|
| 3,499,609 A | * | 3/1970 | Hyman | 242/269 |
| 4,867,392 A | * | 9/1989 | Sato | 242/255 |
| 5,058,447 A | * | 10/1991 | Ikuta | 74/371 |
| 5,110,066 A | * | 5/1992 | Toda | 242/255 |
| 5,193,763 A | * | 3/1993 | Sakaguchi | 242/255 |
| 5,297,756 A | * | 3/1994 | Ikuta | 242/270 |
| 6,325,315 B1 | * | 12/2001 | Chang | 242/255 |
| 6,505,787 B1 | * | 1/2003 | Nilsen | 242/255 |

* cited by examiner

Primary Examiner—Emmanuel M Marcelo
(74) Attorney, Agent, or Firm—Frank J. Benasutti

(57) ABSTRACT

A fishing reel has high speed and low speed gears that are indexed to one another. They are free to rotate relative to one another on a gear shaft, but cannot move axially relative to one another. This gear set can be translated along the gear shaft, into engagement with two separate drive means; one for the low speed gear and one for the high-speed gear.

14 Claims, 14 Drawing Sheets

GEAR SHIFT MECHANISM FOR FISHING REEL

CROSS REFERENCE TO RELATED APPLICATION

This application is a continuation-in-part of my prior co-pending application Ser. No. 60/390,687, filed Jun. 18, 2002, the disclosure of which is incorporated herein by reference as if fully set forth.

BACKGROUND OF THE INVENTION

1. Field of the Invention

This invention relates to fishing reels and, in particular, to a gear shift mechanism having high and low speed gears.

2. Description of the Prior Art

In the prior art, many gear shift systems are known for two speed fishing reels. Some use a drive key, indexed to the gear shift mechanism. The key is moved between positions to engage the high speed gear or the low speed gear. In others, the low speed gear is fixed to the gear shaft. The entire gear shaft is translated into engagement with the high speed gear, or into engagement with the low speed driven gear. In yet another arrangement, the low speed gear is translated along the gear shaft, engaging either with the high speed drive gear, or with its mating low speed driven gear.

In U.S. Pat. No. 6,101,316, one of the drive gears is fixed to the drive shaft for rotation by the drive shaft and the other gear translates axially relative to the drive shaft.

In U.S. Pat. No. 5,058,447, there is a key, which in the prior art was tilted. This patent recognized this problem and introduced an element requiring a "posture maintaining" means. Also, in this patent, the key translates along the shaft.

In U.S. Pat. No. 4,867,392, it is necessary to have a tubular member for the key to travel in and springs on both sides of that key. The gears do not translate with respect to the shaft.

SUMMARY OF THE INVENTION

The current invention uses a new concept. In this design, the high speed and low speed gears are indexed to one another. They are free to rotate relative to one another, but cannot move axially relative to one another. This gear set is then translated along the gear shaft, into engagement with one of two drive means; one for the low speed gear and one for the high-speed gear.

This design has several advantages. The means for driving the gears is fixed to the gear stud. This allows for a much stronger arrangement than a translating key. Second, construction can be simple and inexpensive. Third, a more precise feel can be achieved. For example, with a translating low speed gear such as is known in the prior art, drive forces are first applied to the low speed gear, then into the high-speed gear (in high speed). Thus, any clearances existing between the low speed gear and the gear shaft are compounded by the clearance between the high-speed gear and low speed gear. With my system, once it is engaged, there is no "slop" between the drives and, therefore, there is less backlash.

I also have invented a new push button means for moving the gear shift mechanism.

DESCRIPTION OF THE PREFERRED EMBODIMENTS

Figure 1:
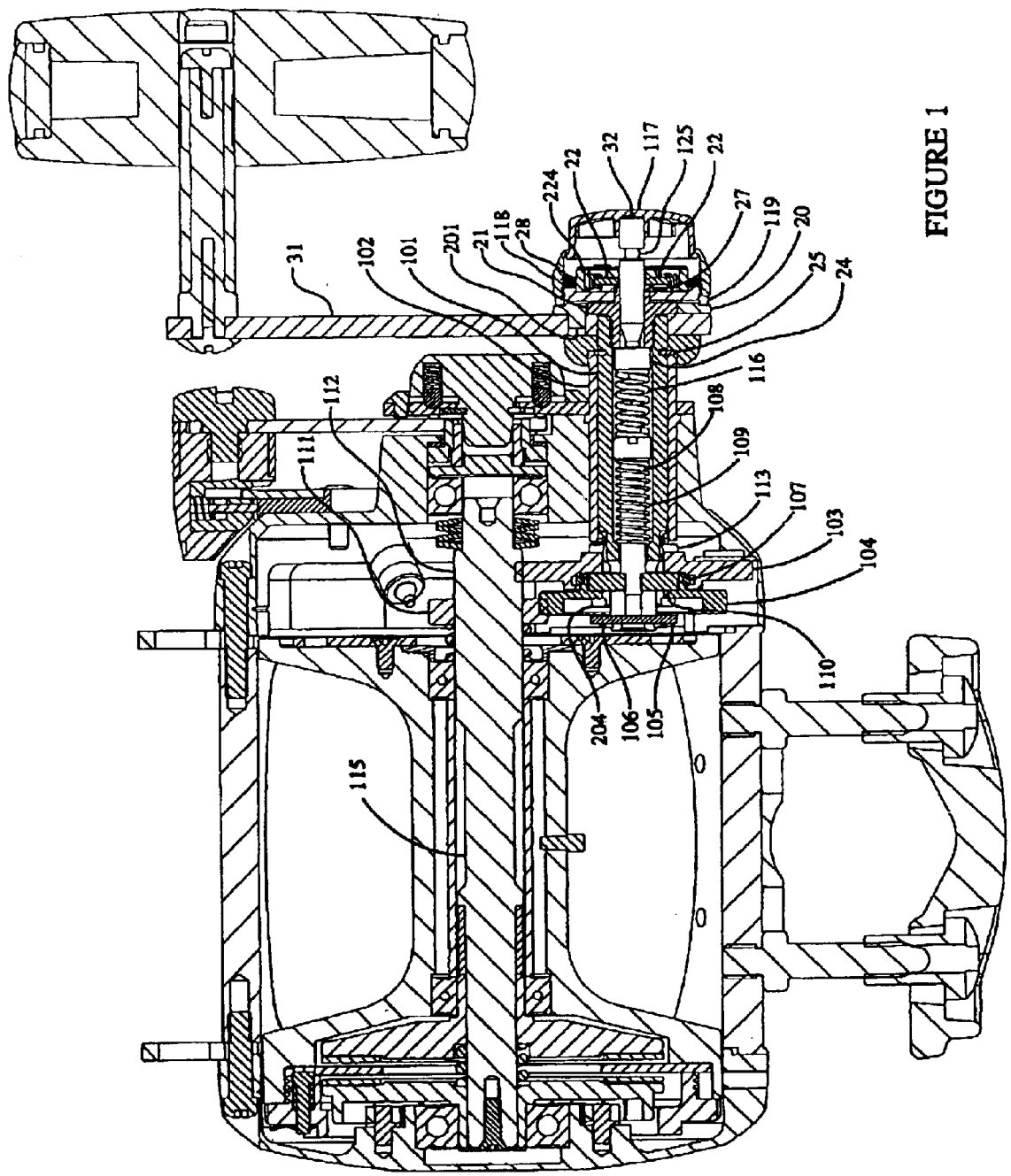
FIG. 1 is a cross-section of a fishing reel in accordance with my new design.
Figure 7:
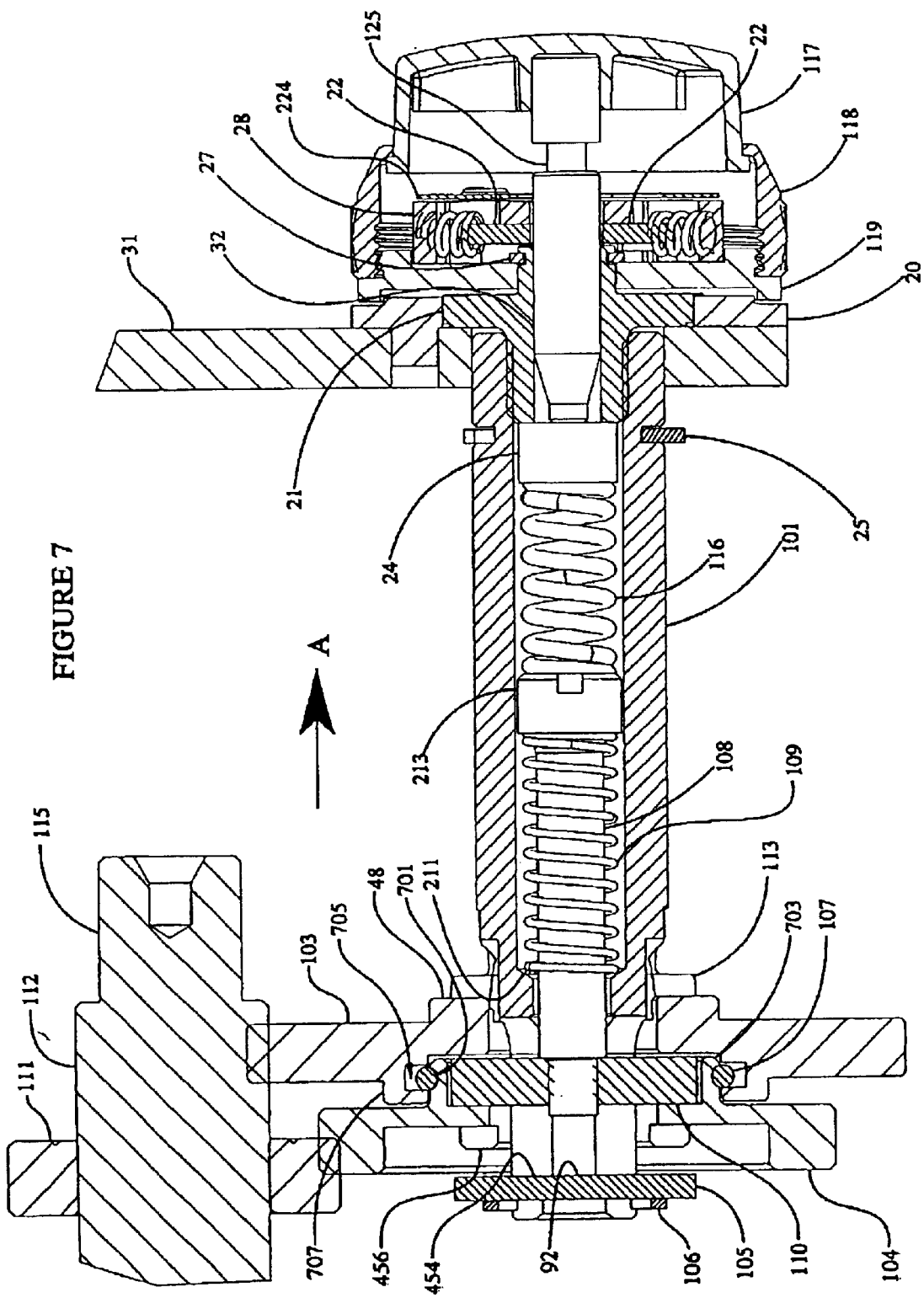
FIG. 7 is a cross-section of a portion of a fishing reel in accordance with my invention.

FIG. 1 shows a cross-section view of a real with my new gear shift means design. The gear shaft 101 is supported by a gear shaft bushing 102, and is retained in the bushing by a retaining ring 25. Journal ed to the gear shaft is a high-speed drive gear 103 and a low speed drive gear 104. These are retained axially with respect to one another by a retaining ring 107. When assembled, this ring 107 is in a groove 701 in the hub 703 in the low-speed gear and is in the groove 705 in the hub 707 of the high speed gear, as shown in FIG. 7. The gears are free to rotate relative to one another; but not translate relative to one another. This two gear assembly can translate along the gear shaft, and also rotate relative to the gear shaft. Between the gears is a shift plate 110. This shift plate rides in a pocket 210, FIG. 2, within the two gear assembly, and in a slot designated generally 114, FIG. 2, in the gear shaft 101. To this shift plate 110 is fixed a plunger or shaft 108. This plunger 108 is urged axially outwardly of the reel (to the right as viewed in FIGS. 1 and 2) by a light shift spring 109, FIG. 2. This spring 109 also urges the two gear set to the right, so that the driven portion 203, FIG. 2, of the high speed gear 103 is forced into engagement with the high-speed gear drive portion designated generally 113 of the gear shaft 101, as shown in FIGS. 1 and 2.

The high-speed drive gear 103 is always meshed with the high speed driven gear 112. Likewise the low speed drive gear 104 is always meshed with the low speed driven gear 111. The driven gears share a common spool shaft 115; to which they are fixed.

Figure 2:
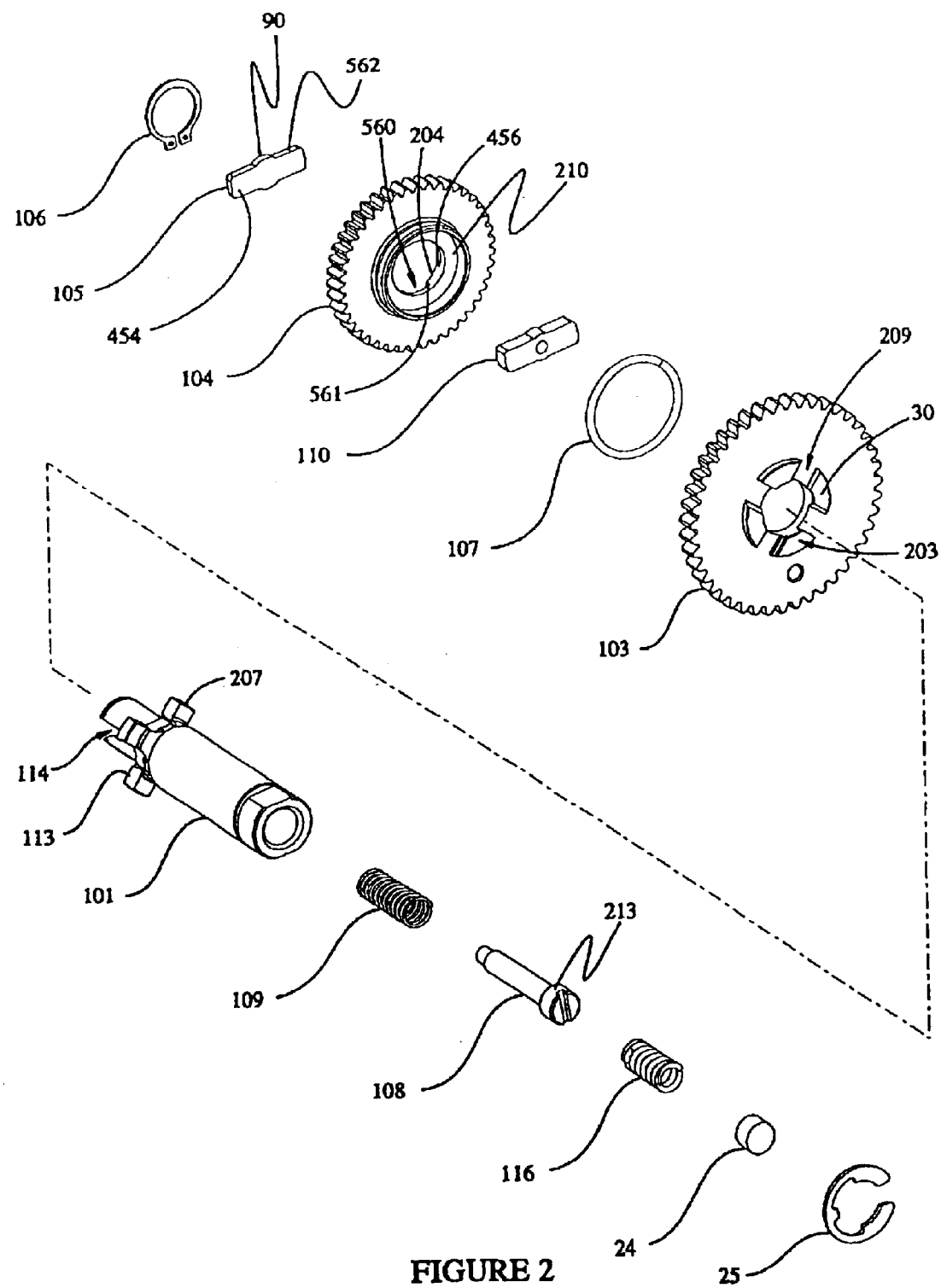
FIG. 2 is an exploded view of a portion of the fishing reel shown in FIG. 1.

The low speed gear drive plate 105, FIG. 2, is retained to the gear shaft 101 by retaining ring 106. As can be seen in FIG. 1, it is disengaged from the low speed drive gear when the reel is in the high speed condition.

FIG. 2 shows an exploded view of the gear shift system. The gear shaft 101 has a slot 114 on the end. It also has the high-speed gear drive portion 113 machined into it. The low speed gear drive plate 105 engages in the slot 114 of the gear shaft 101. On one side of the high-speed drive gear 103 are a series of bosses 30, which comprise the driven portion designated generally 203 of the high speed gear 103 and which mesh with the high speed gear drive portion 113 of the gear shaft 101.

The shift plate 110 is sandwiched between the two drive gears. Its purpose is to translate the gear set along the gear shaft 101 when urged by either depressing or releasing the shift button 117 FIG. 1.

A shift button 117 is used to shift the reel into low speed. A threaded retaining collar 118 retains the shift button 117 on the reel. The shift button 117 is retained in a depressed condition by a catch means 22 which engages in a groove 125 in the shift button shaft 32.

When the shift button 117 is depressed, it acts upon the spacer 24, which in turn acts upon the heavy shift spring 116. This in turn creates a load on the plunger 108; which in turns acts upon the shift plate 110. This urges the two gear set towards the left end of the gear shaft 101 when viewed as in FIGS. 1 and 2; thus disengaging the high-speed gear 103 from the high-speed gear drive portion 113 of the gear shaft 101. The tabs 204 on the low speed gear 104 then engage with the low speed gear drive plate 105, locking the low speed gear 104 to rotate with the gear shaft 101. The reel is now in the low speed condition.

When the shift button 117 is released (as in FIG. 1), the light shift spring 109 urges the plunger 108 towards (the right) the outside of the reel. This in turn pulls the shift plate 110 in the same direction, thereby moving the two gear set to the right. The low speed gear 104 is disengaged from the low speed gear drive plate 105, by translation of the two gear set. The high-speed gear then engages the high-speed gear drive portion 113 of the gear shaft 101. The reel is now in the high-speed condition.

Figure 3:
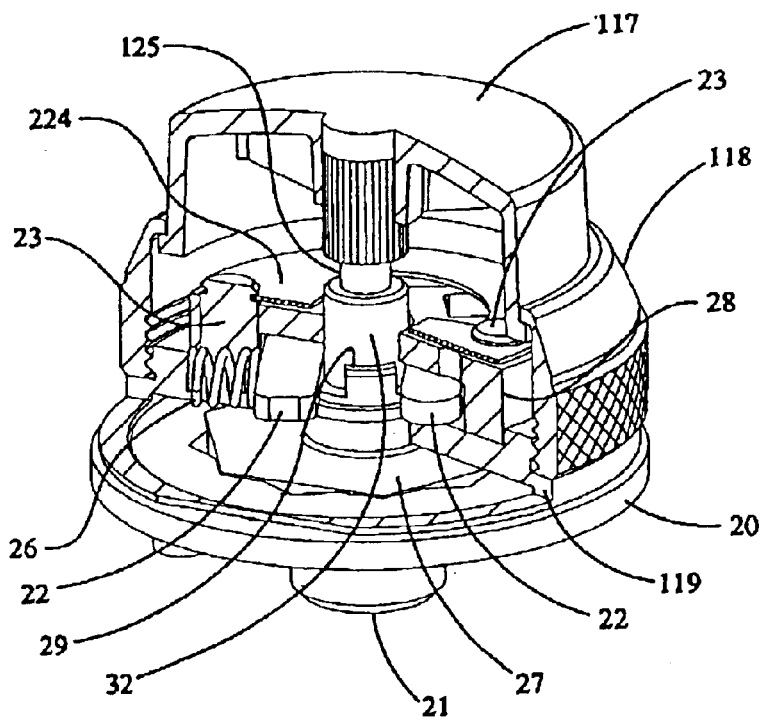
FIG. 3 is a perspective view, partially in section, of a portion of the fishing reel shown in FIG. 1.
Figure 4:
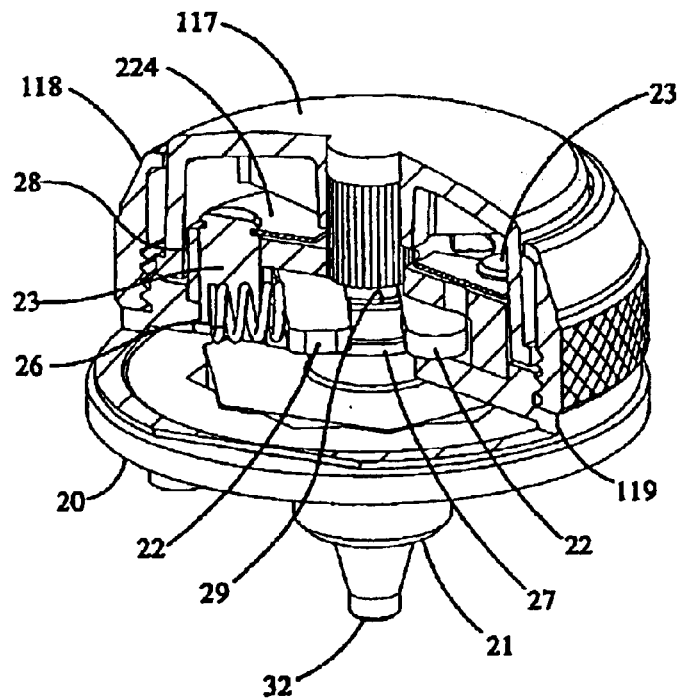
FIG. 4 is a perspective view, partially in section, of a portion of the fishing reel shown in FIG. 1.
Figure 5:
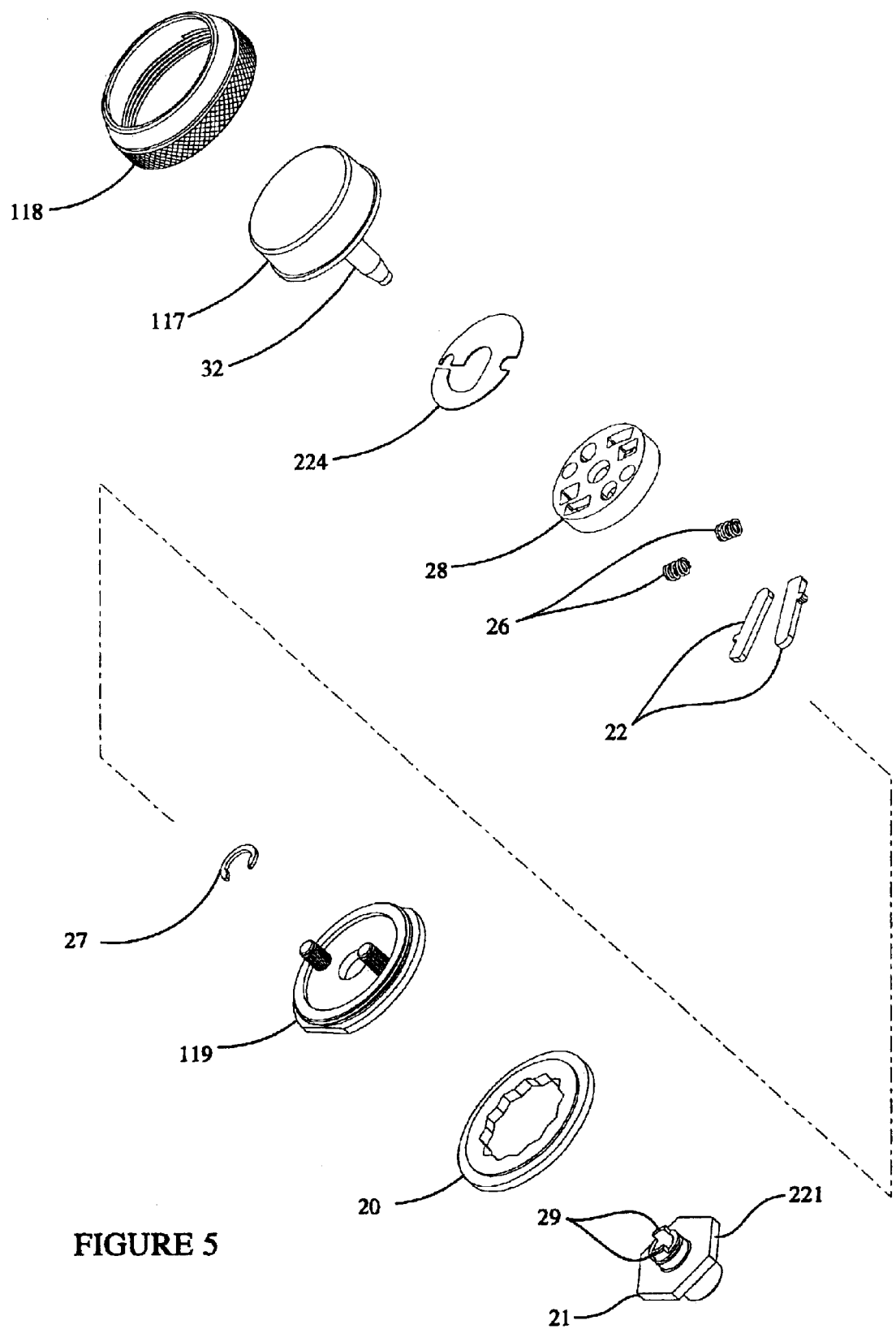
FIG. 5 is an exploded view of a portion of the fishing reel shown in FIG. 1.
Figure 6:
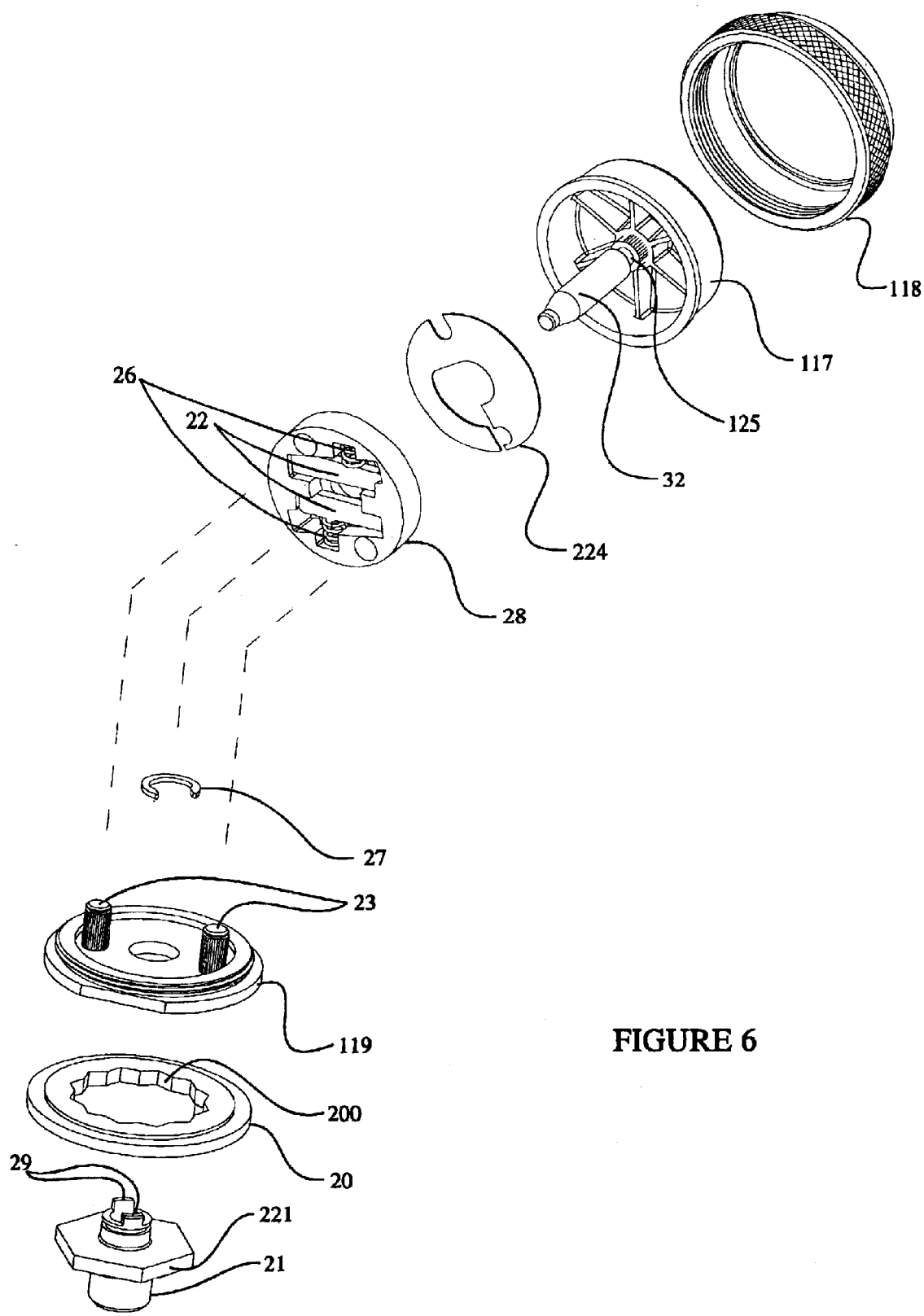
FIG. 6 is an exploded view of a portion of the fishing reel shown in FIG. 1.

FIGS. 5 and 6 show exploded views of the shift button means. FIGS. 3 and 4 show partial section views of the shift button means. There is a handle screw 21 which retains the handle 31, FIG. 1, to the gear shaft 101. This handle screw is prevented from rotating after installation by a handle screw lock plate 20. The handle screw has a hexagonal portion 221 to engage the double hex cut out portions 200 of the lock plate 20. A shift release base 119 is installed over the handle screw 21 and retained by a retaining ring 27. A pair of catch arms 22 are installed in the catch housing 28 with a pair of springs 26. These springs 26 urge the catch arms 22 toward one another (when viewed as in FIG. 6) and toward a closed position. This catch assembly of catch arms 22, catch housing 28 and springs 26 is fixed to the shift release base 119, by means of a pair of pins 23 which are press fit in the base 119 and retaining plate 224. This catch assembly is installed such that the catch arms 22 are separated by bosses 29 on the handle screw 21. When the collar 118 is rotated, as in FIG. 3, relative to the handle screw 21, the surfaces of the catch arms 22 "cam up" on the outside edges of the bosses 29; thus spreading them further apart. This allows the shaft 32 to be inserted through the housing 28 and into the handle screw 21; for assembly. Then the collar 118 is rotated to allow the catch arms 22 to engage the outer surface of the shaft 32. This is in the high speed position as shown in FIG. 3. The catch arms 22 are under load due to the springs 26. The shift button 117 is retained in the reel by a retaining collar 118; which is fixed to the shift release base 119. When the reel is in the high-speed condition, the shift button shaft 32 separates the catch arms 22. When the button 117 is pushed into the reel, the reel is in a low speed condition, and the catch arms 22 fall into the groove 125 in the shift button shaft 32 under the pressure of the springs 26. In order to release the shift button 117 from the depressed position, the retaining collar 118 is rotated in either direction by the user. This in turn rotates the shift release base 119 and the catch housing assembly 28. The catch arms 22 cam off of the bosses 29 on the handle screw 21, causing the catch arms to separate from one another. When the distance between them exceeds the diameter of the shift button shaft 32, the spring force of the light shift spring 109 forces the shift button 117 into an outwardly extended position.

The new design allows for a larger surface of area of the button, thus making it easier to use and permitting the use of heavier springs. Heavier springs allow for more reliable engagement of the high and low speed drive gears with their respective drive means.

A tab or protrusion 201, FIG. 1, on screw lock plate 20 fits in a hole in lever arm 31 to lock down handle screw 21 and prevent it from moving.

As is noted from the description above, there are two separate drive means for each of the separate gears in the two-gear set.

The high speed condition is the normal condition for this device. Referring to FIG. 7, when the fisherman turns the crank handle and lever arm 31, the parts would normally come together and engage in the high speed condition. The high speed gear drive portion 113 is engaged with the high speed driven portion 203, FIG. 2, of the high speed gear 103; that is, the slots designated 209 in FIG. 2 embrace the protrusions or lugs 207 that make up the high speed drive portion 113, FIG. 2. In that condition, the lugs 207 engage the bosses 30 and drive them upon rotation of the gear shaft 101 in response to the rotation of the handle and lever arm means 31.

The spring 116 is not normally under load. Therefore, to get into the high speed condition, the spring 109, which is seated against the internal shoulder 211 of the shaft 101, drives the head 213 of the plunger 108, FIG. 7, in the direction of the arrow A from the position as shown in either FIG. 8 or FIG. 9, to the position shown in FIG. 7. If the device is in the intermediate condition wherein it is neither in high speed nor in low speed, as shown in FIG. 7, the first things to engage may be the opposed radial faces 246, 248 (see FIG. 11) of the lugs 207 and tabs 30, respectively. Upon turning the handle, as the face 246 of the lugs 207 moves along the face 248 of the high speed drive gear 103, eventually the lugs 207 drop into the slots 209. This allows the drive portion 113 of the shaft to drive the driven portion 203 of the high speed gear. In my preferred embodiment, the lug 207 first drops into the relieved area designated generally 279 of the slot 209. There the slot 209 is wider than the lug 207.

As the gear shaft 101 is rotated relative to the high speed gear 103, the lugs 207 will try to engage into the slot 209. The relieved area 279, FIG. 11, of the slot 209 acts as a lead for the lug 207. Without the relieved area 279, the rotation can be rapid enough that there is not enough time for the load provided by the light shift spring 109 to overcome the inertia of the gear assembly, resulting in "skipping"; whereby the handle will rotate beyond the engagement point of the lug 207 and slot 209. The relieved area 279 effectively increases the width of the slot 209, by providing additional space and the time for the light shift spring 109 to overcome the inertia of the gear assembly and solidly engage the lug 207 into the slot 209. The relieved area 279 also prevents the sharp edge 372 of lug 207 and the sharp edge 374 of the bosses 30 from contacting, thereby avoiding wear and allowing for a smoother transition.

In this condition, the surface 352 of the lug 207 is presented in juxtaposition to the surface 350 of the boss 30 before the parts engage. As rotation continues, those surfaces engage. There is a second step down designated generally 480, which allows the lug 207 to drop completely into the slot 209.

Figure 8:
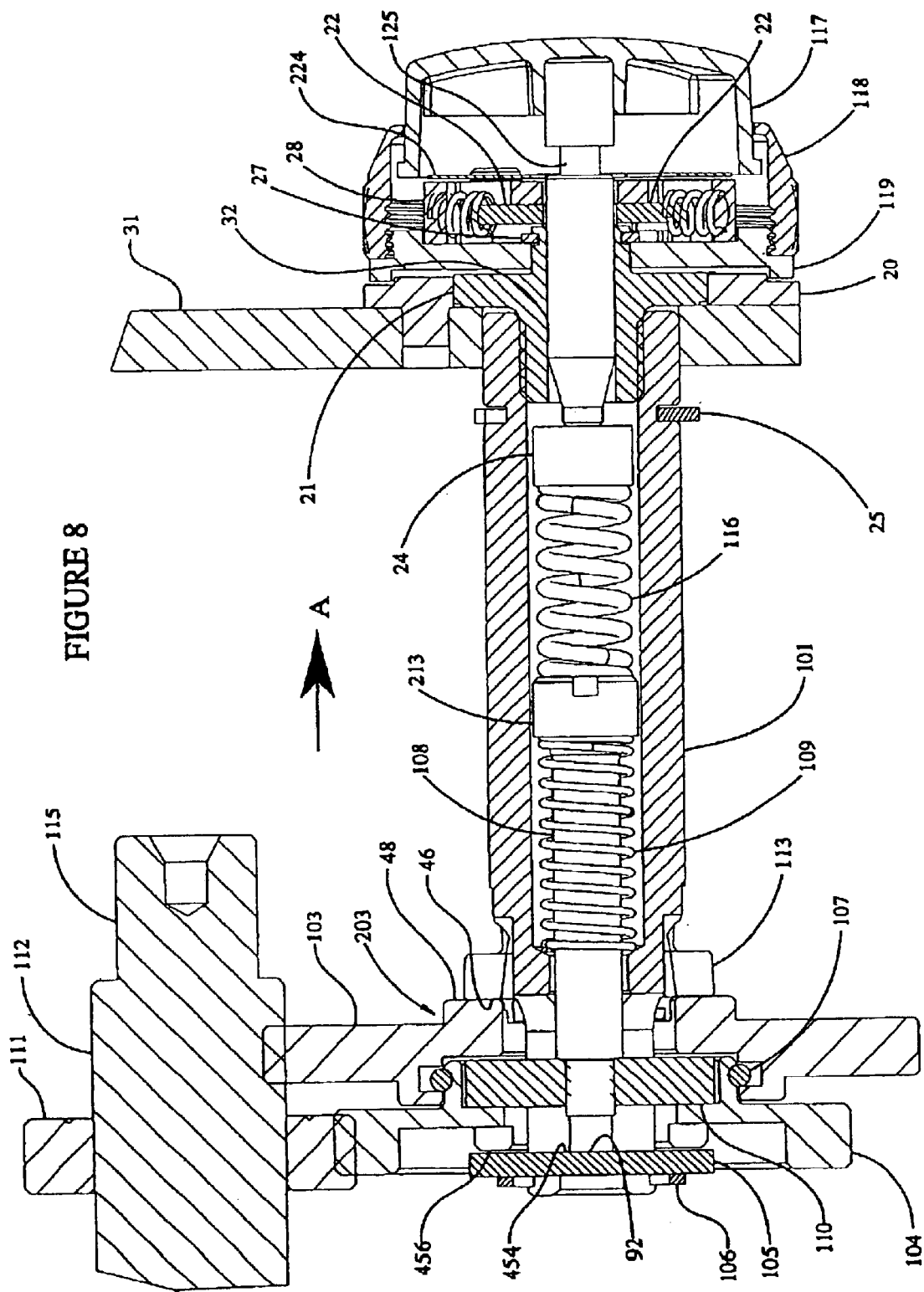
FIG. 8 is a view similar to FIG. 7 with some parts in a different position.
Figure 9:
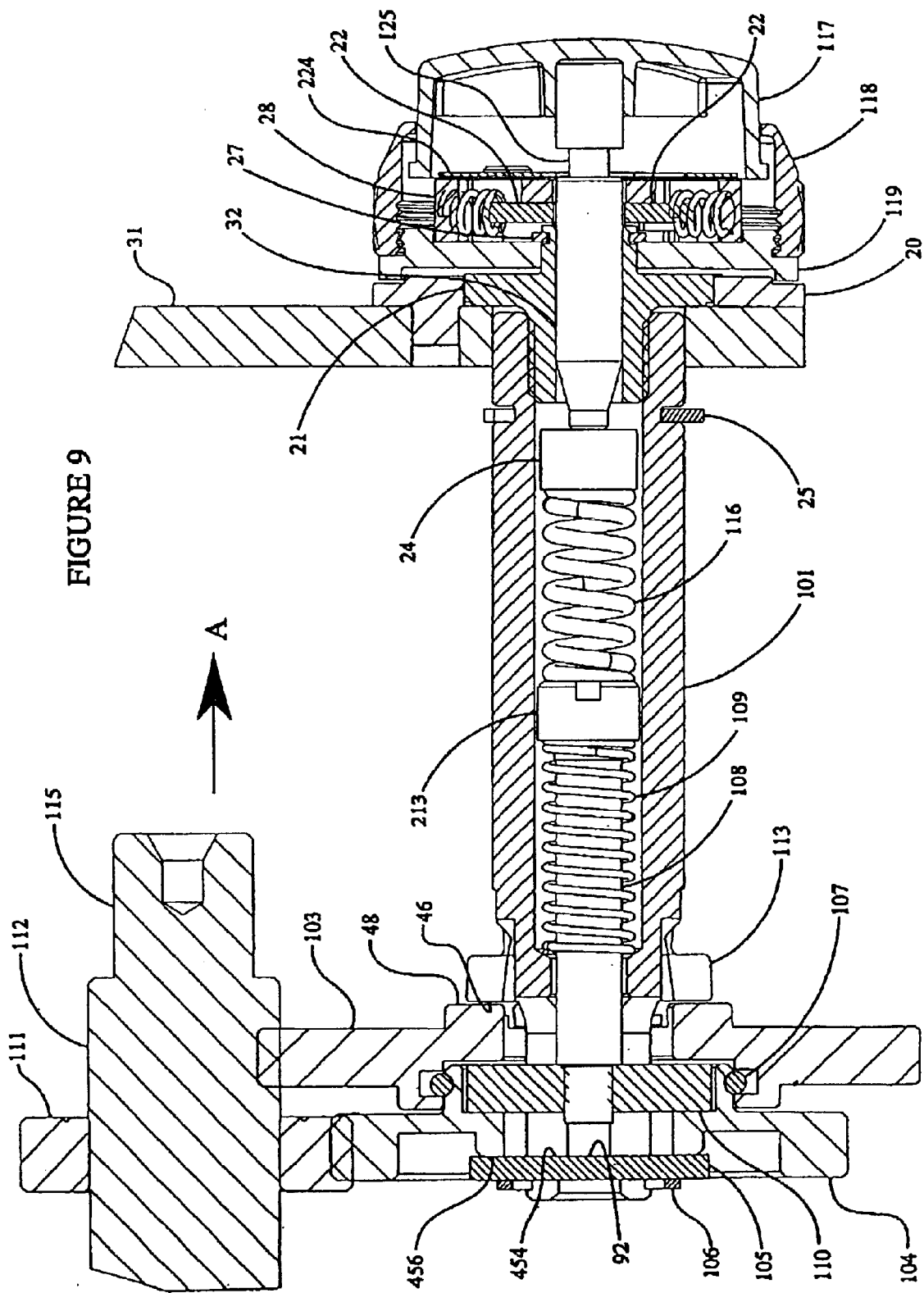
FIG. 9 is a view similar to FIG. 7 with some parts in a different position.
Figure 10:
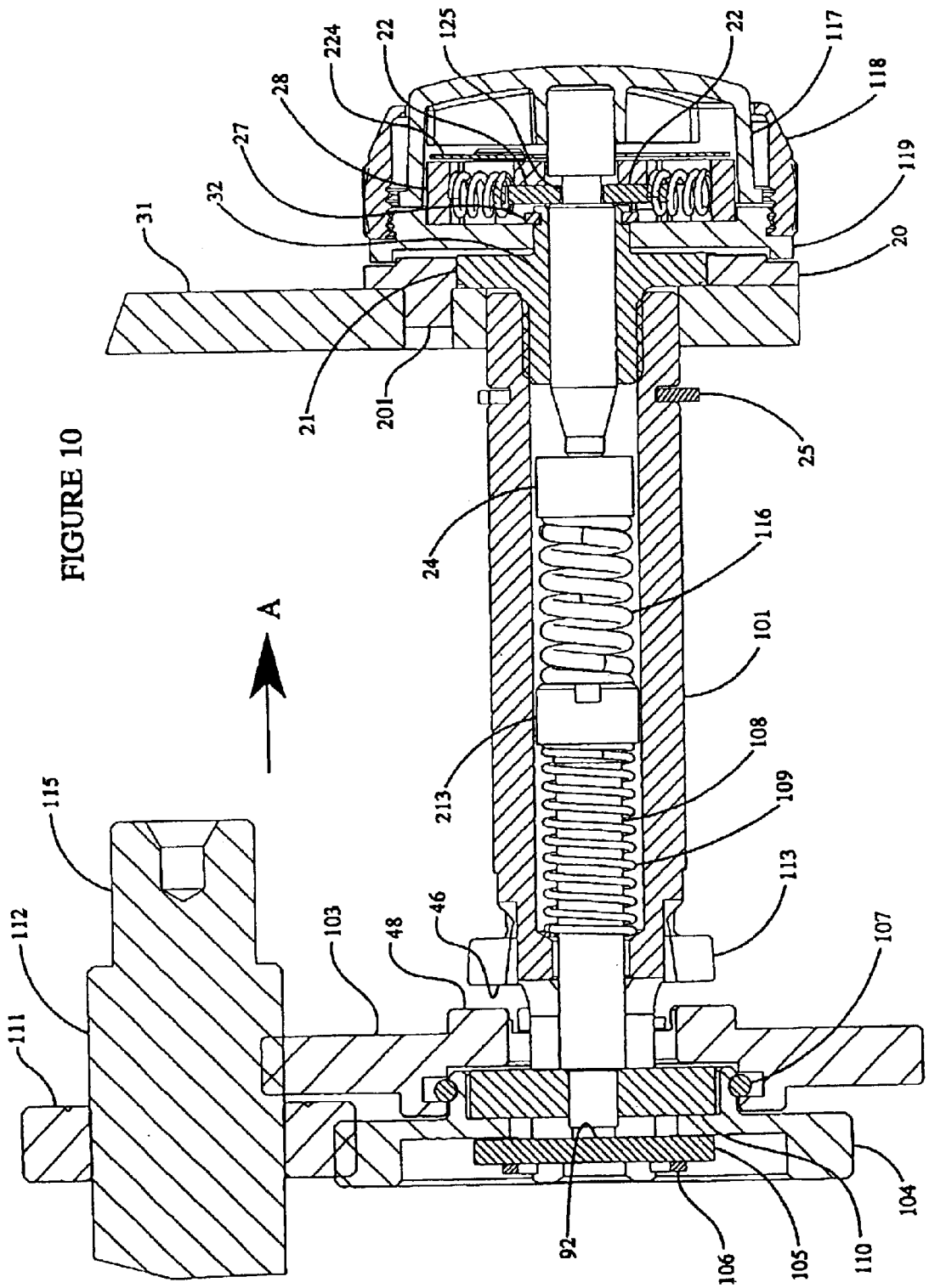
FIG. 10 is a view similar to FIG. 7 with some parts in a different position.

If the parts were in the intermediate position as shown in FIG. 8, and the fisherman cranked the handle backwards, the lugs 207 of the high speed drive portion 113 would drop into the relieved area 279. Surface 246 of lug 207 would be mated to surface 250 of the relieved area 279. The lugs 207 would remain engaged with the relieved area 279 until the fisherman cranked forward on the handle. At this point, the lug 207 would move completely into the slot 209. Face 352 of the lug 207 would be forced against face 350 of the boss 30. The angle of these faces creates a wedge. The harder the fisherman cranks on the handle, the tighter the gear is pulled to the lug.

This wedge effect is vitally important. If the faces were perpendicular, they would function just fine when new. But with use, wear is unavoidable. This wear on the faces 350 and 352 would create an angled face in the opposite direction to that shown in the figures. This would be a ramp, which would tend to force the gear away from the drive means, causing the reel to fail.

To shift from high speed to low speed, the fisherman would press the button 117 inwardly. There are several possible scenarios at this point. If there is no load on the handle, the heavy shift spring 116 would act upon the plunger 108, which in turn would act upon the gear set. The gear set would be disengaged from the high speed drive means 113 of the gear shaft 101. The reel would momentarily be in a neutral condition.

Figure 14:
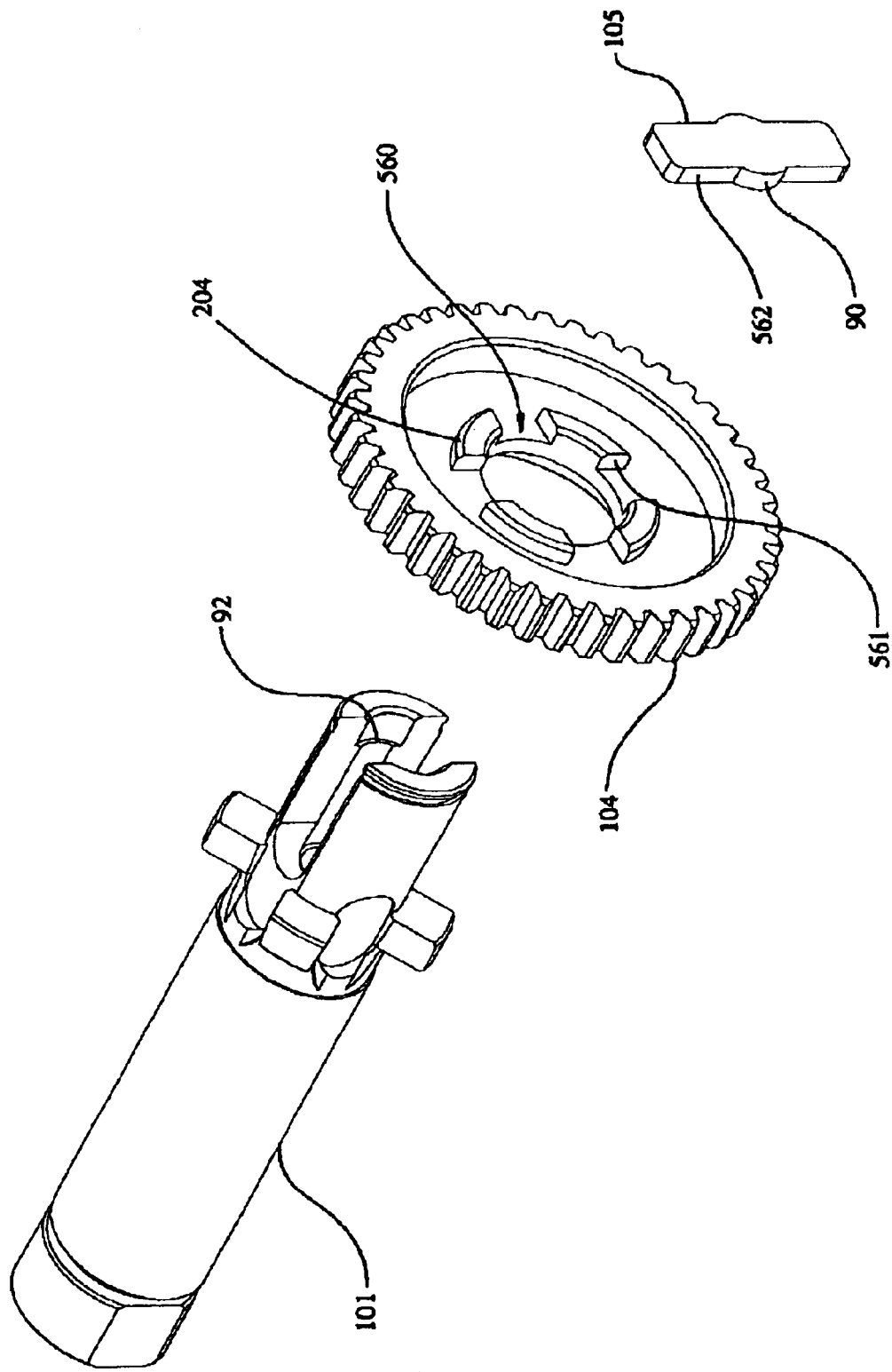
FIG. 14 is an exploded perspective view of certain parts of a reel in accordance with my invention.
Figure 15:
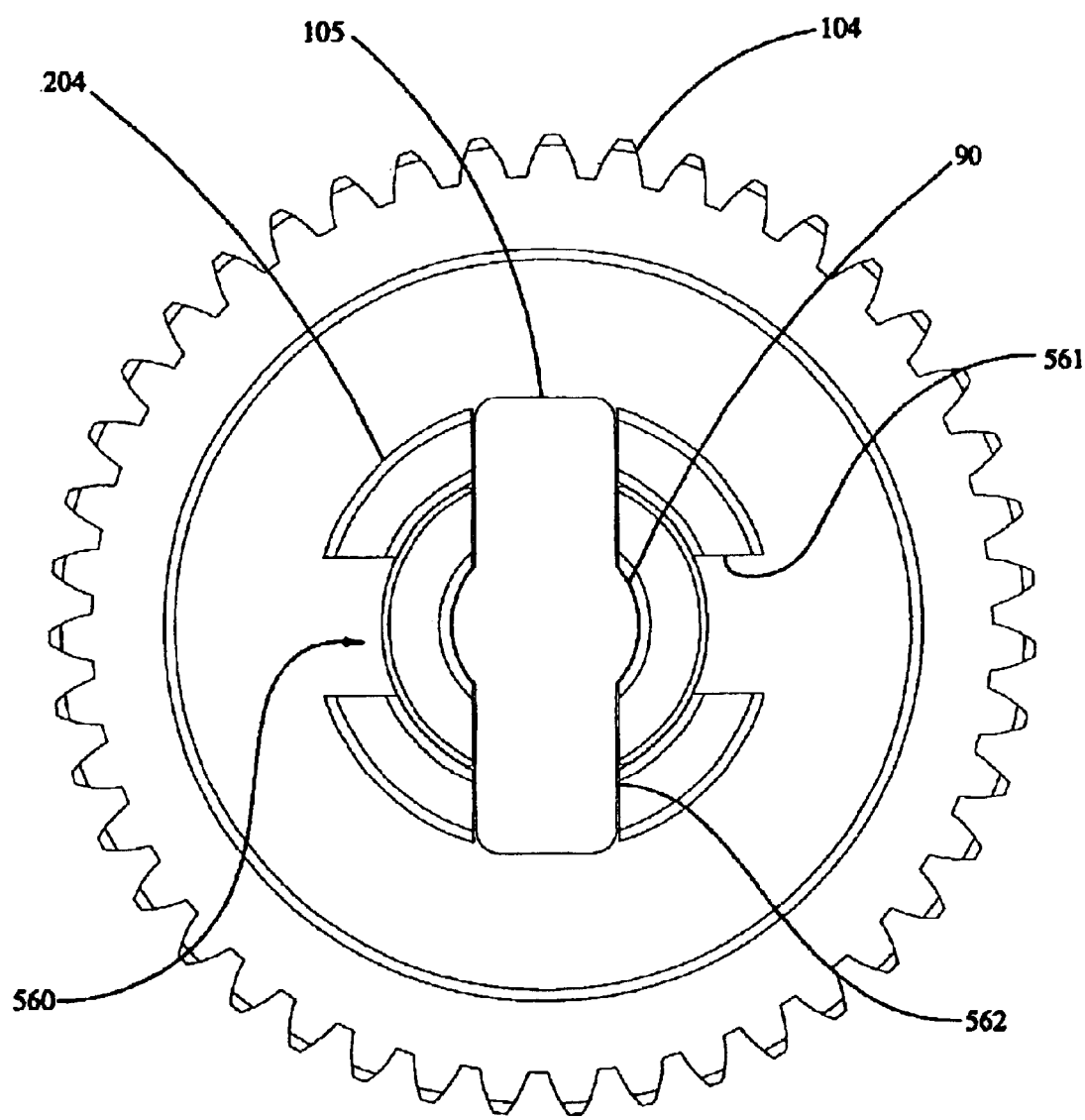
FIG. 15 is an enlarged end view of certain parts of a reel in accordance with my invention.

At this point, one of two conditions will exist. The low speed drive plate 105 could line up with the slot designated generally 560, FIGS. 2, 14 and 15 of the lower speed drive gear 104. In this condition, the gear set will directly engage into the low speed condition (FIG. 15).

The second possibility would be that the slot 560 of the low speed drive gear 104 did not line up with the low speed drive plate 105. In this condition, surface 454 of the low speed drive plate 105 will abut surface 456 of the tab 204 of the low speed drive gear 104. As can be seen, the gear set will not have completely traveled. The heavy shift spring 116 will be additionally compressed, further loading the gear set. When the fisherman rotates the handle, the low speed drive plate 105 will rotate relative to the low speed drive gear 104. This rotation will continue until the low speed drive plate 105 lines up with the slot 560. At this point the additional compression of the heavy shift spring 116 will be relieved and the gear set will completely translate, engaging the low speed drive plate 105 with the low speed drive gear 104.

If there is load on the handle when the fisherman presses button 117 to go from high speed to low speed, the mechanism will not immediately translate. This is due to the wedge effect of the surface 350 of boss 30, and surface 352 of lug 207. The motion of the button 117 will entirely go into compressing the heavy shift 116. As soon as the load on the handle is reduced to the point that the spring force due to the compression of the heavy shift spring 116 can overcome the wedge effect, the gear set will be translated and disengaged from the high speed drive means 113. At this point the mechanism will behave as described above.

To go from the low speed condition to the high speed condition, release the shift button once again. The user must let up upon the handle or else the frictional forces on the surfaces 561, 562, FIG. 2, will not let the device move.

Figure 11:
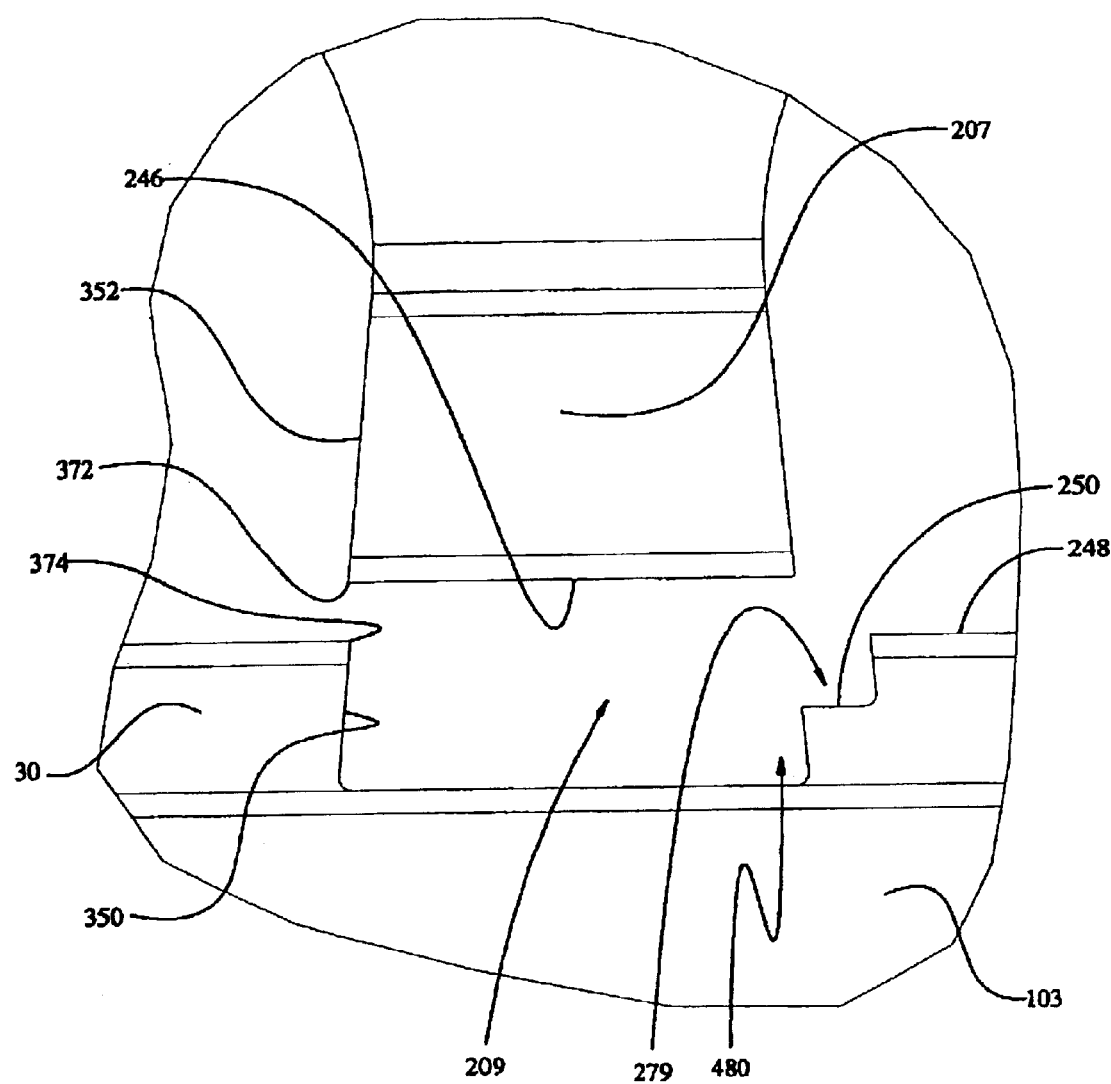
FIG. 11 is a greatly enlarged elevation of the faces of some parts of the reel in accordance with my invention.

As shown in FIG. 7, with the button partially depressed, the two gear set has moved to the left and the drive portion 113 is disengaged axially from the driven portion 203. In that intermediate position being neither the high speed nor low speed condition, the drive plate 105 has moved out of the slot 560 and is not engaged with the tabs 204. As the button continues to move inwardly and to the left, as shown in FIG. 8, the surfaces 350 and 352, FIG. 11, are completely disengaged and either one of two conditions would occur. Either the surfaces 454 and 456 would engage or if they missed, then the motion would continue until the part 105 dropped into the slot 560. Referring to FIG. 14, if it eventually does drop into the slot, then the surface 561 on the tab 204 would eventually engage the facing surface 562 of the low speed drive plate 105, so that the low speed drive plate would drive the low speed gear 104 upon rotation of the handle.

The bulge 90 on the drive plate 105, FIG. 14, provides a radial surface for the part 105 to engage the internal shoulder 92, FIG. 14, in the gear shaft 101.

Referring again to FIG. 11, the angles and distances shown between the tapered portions equal the back-off of the second surfaces plus tolerances and clearances.

Figure 12:
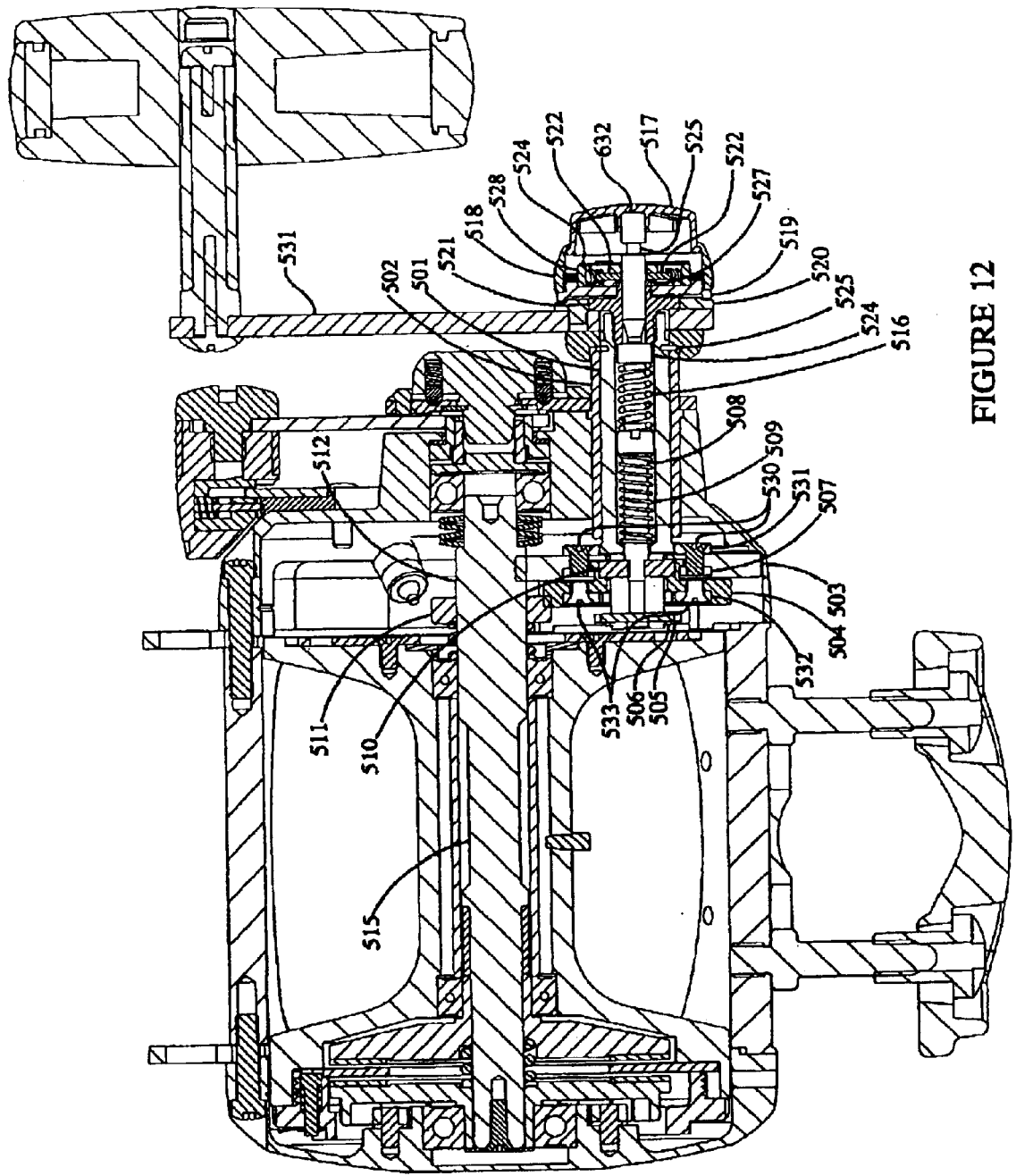
FIG. 12 is a section of a reel in accordance with my invention.
Figure 13:
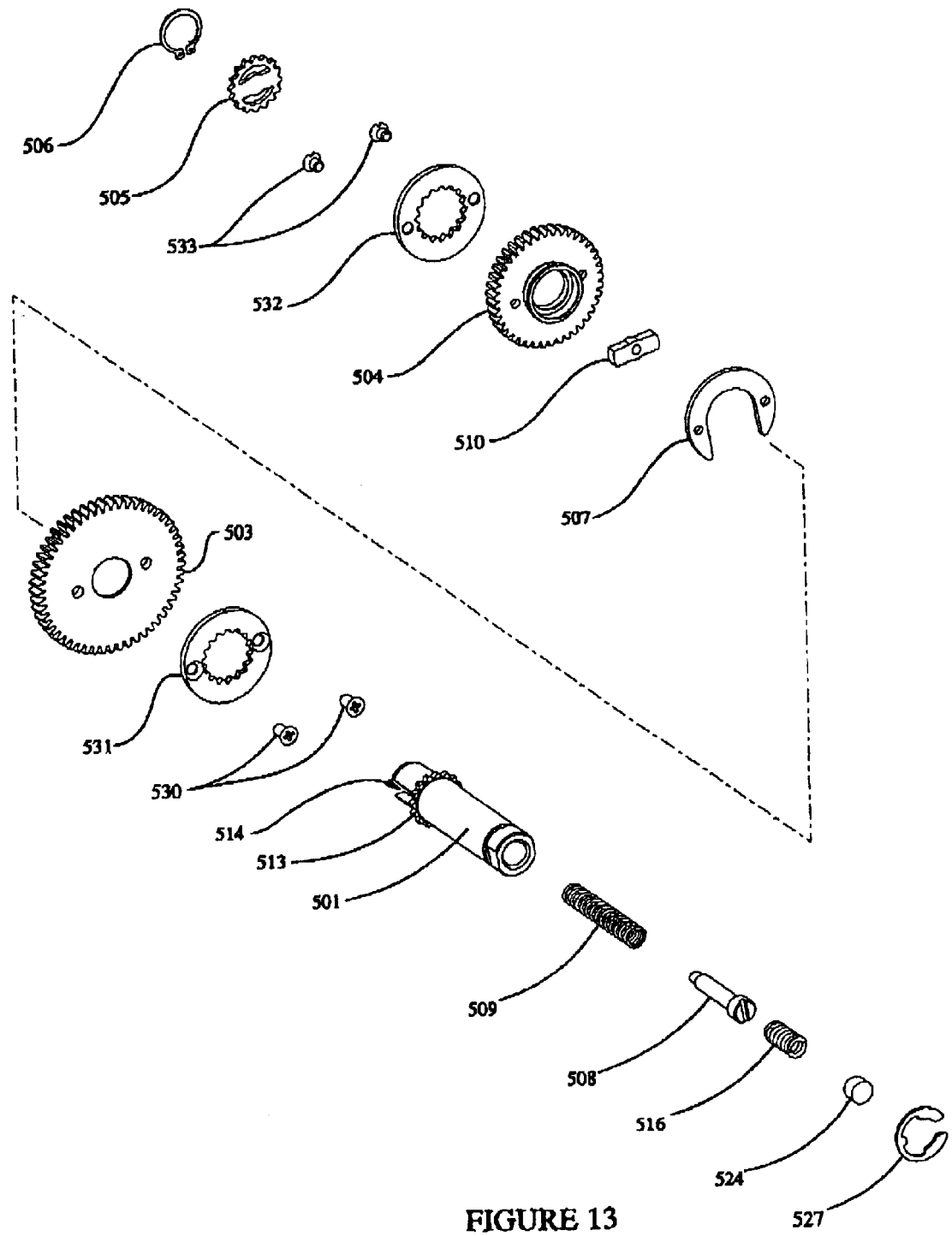
FIG. 13 is an exploded perspective view of certain parts of a reel in accordance with my invention.

A second embodiment of the new design is shown in FIGS. 12 and 13. FIG. 12 shows a section view of a reel with the new gear shift design. The gear shaft or stud 501 is supported by a gear shaft bushing 502, and is retained in the bushing by a retaining ring 527. Journaled to the gear shaft is a high-speed drive gear 503 and a low speed drive gear 504. These are retained to one another by a retaining plate 507. The gears are free to rotate relative to one another, but not translate relative to one another. Attached to each drive gear is a mesh plate 531 and 532, respectively; each of which is retained to the gears by screws 530 and 533, respectively. This gear assembly can translate along the gear shaft, and also rotate relative to the gear shaft. Between the gears is a shift plate 510. The shift plate 510 rides in a pocket created by the gear assembly, and in a slot designated generally 514 in the gear stud 501. To the shift plate 510 is fixed a plunger 508. The plunger 508 is urged axially outward by a light shift spring 509. This also urges the gear set into engagement with the high-speed gear drive 513 portion of the gear stud.

The high-speed gear 503 is always meshed with the high speed driven gear 512. Likewise, the low speed gear 504 is always meshed with the low speed driven gear 511. The driven gears are fixed to a common spool shaft 515.

The low speed gear drive plate 505 is retained to the gear shaft 501 by a retaining ring 506. As can be seen in FIG. 12, it is disengaged from the low speed drive gear mesh plate 532 when the reel is in high speed.

A shift button 517 is used to shift the reel into low speed. A threaded retaining collar 518 retains the shift button 517 in the reel. The shift button 517 acts upon a spacer 524, which in turn acts upon a heavy shift spring 516. The shift button 517 is retained in a depressed condition by a catch means 522, which engages in a slot 525 on the shift button shaft 632.

FIG. 13 shows an exploded view of the gear shift mechanism. The gear shaft 501 has a slot 514 on the end. It also has the high-speed gear drive 513 machined into it. The low speed gear drive 505 engages in the slot 514 of the gear stud 501. It is retained by a retaining ring 506. On one side of the high-speed drive gear 503 is mounted a mesh plate 531; which meshes with the gear drive portion 513 of the gear shaft 501. The shift plate 510 is sandwiched between the two drive gears. Its purpose is to translate the gear set along the gear shaft 501 when urged by either depressing or releasing the shift button 517.

When the shift button 517 is depressed, it acts upon the spacer 524, which in turn acts upon the heavy shift spring 516. This in turn creates a load on the plunger 508, which in turn acts upon the shift plate 510. This urges the gear set towards the end of the gear shaft 501, thereby disengaging the high-speed gear mesh plate 531 from the high-speed gear drive 513 of the gear shaft 501. The low speed gear mesh plate 532 then engages with the low speed gear drive plate 505, locking the low speed gear 504 to the gear shaft 501. The reel is now in the low speed condition.

When the shift button 517 is released, the light shifter spring 509 urges the plunger 508 towards the outside of the reel. This in turn pulls the shift plate 510 in the same direction, thereby moving the gear set. The low speed gear mesh plate 532 is disengaged from the low speed gear drive plate 505, by translation of the gear set. The high-speed gear mesh plate 531 then engages the high speed gear drive 513 of the gear shaft 501. The reel is now in the high-speed condition.

This embodiment has several advantages. It is simpler to manufacture than the first embodiment. The mesh plates and drive plates are metal stamping or could be made from powdered metal. The drive gears are simple turnings.

This embodiment is durable. Whereas the first embodiment requires the use of tapered drive surfaces to provide durability, this design does so without expensive machining. The drive plates and mesh plates have many teeth. When either gear is engaged, all of the teeth are meshed, providing greater load bearing surface area that the first design.

Also, this embodiment does not require the lead step of the previous embodiment due to the much greater number of teeth. It takes less rotation before the teeth of the mesh plate line up with the teeth in the drive plate. Therefore, the possible rotation of the handle is much less, allowing less time for acceleration of the handle by the user. This results in less force acting upon the edges of the teeth during engagement.

Finally, this design gives a perception to the user of a more precise feel. Again, this is due to the greater number of teeth. The amount of rotation of the handle that is necessary before the drive plate and mesh plate engage is substantially less. This quickness in shifting is perceived by the user as a shifting mechanism with greater precision.

From the above description, it will be understood that I have disclosed a fishing reel comprising: a high speed gear; a low speed gear; a gear shaft; said low and high speed gears fixed axially with respect to one another and mounted on said gear shaft to rotate thereabouts; a plurality of driven pinion gears engaged with said high speed and low speed gears to be driven thereby; key means juxtaposed to engage with the gears and drive them and thereby drive said pinion gears; and gear shift means juxtaposed to said gears to translate said high and low speed gears axially on said gear shaft and thereby engage said key means.

I have also disclosed a reel wherein the gear shift means comprises a spring biased plunger means comprising: a shift button; a catch assembly means; said catch assembly means comprising a plurality of catch arms spring biased toward one another; a catch housing; and a retaining plate; a shift button shaft connected to said shift button; said shift button shaft being biased outwardly so that said button is biased outwardly of the reel; said shift button shaft having a groove therein for engaging said catch arms to retain said shift button in a depressed inwardly position in said reel; a shift release assembly means comprising a shift release base and a collar fixed to said shift release base; handle means comprising a handle and a handle screw; said handle screw having a plurality of bosses extending therefrom; said catch arms being separated by said bosses which are spring biased to be in engagement therewith, such that upon rotation of said collar, said catch arms cam on said bosses to spread them further apart until they reach a diameter that releases them from engagement with the groove in the shift button shaft, so that the shaft can pass therebetween.

What is claimed is:

1. A fishing reel comprising:

a high speed gear;

a low speed gear;

a gear shaft;

said low and high speed gears fixed axially with respect to one another and mounted on said gear shaft to rotate thereabouts;

a plurality of driven pinion gears engaged with said high speed and low speed gears to be driven thereby;

key means juxtaposed to engage with the gears and drive them and thereby drive said pinion gears; and gear shift means juxtaposed to said gears to translate said high and low speed gears axially on said gear shaft and thereby engage said key means.

2. The reel of claim 1 wherein said gear shift means comprises a spring biased plunger means.

3. The reel of claim 2 wherein the spring biased plunger means further comprises a plunger fixedly connected to a shift plate juxtaposed to engage said gears to move the gears into driven positions upon axial movement of the shift plate and plunger.

4. The reel of claim 3 wherein the shift plate is juxtaposed to push on the low speed gear and force it to move axially into engagement with a drive plate fixed axially to the gear shaft to rotate therewith and simultaneously cause the high speed gear to disengage from a high speed drive position fixed axially on the gear shaft.

5. The invention of claim 4 wherein the spring-biased plunger means comprises a plunger, a light weight spring mounted thereabouts to bias the plunger outwardly of the reel; said gear shift means further comprising a button means mounted on said reel; a heavier weight spring between the plunger and said button means to overcome frictional forces between the gears and the key means.

6. The reel of claim 1 wherein said key means further comprises a low speed drive plate fixed axially to the gear shaft to rotate therewith and juxtaposed to said low speed gear to drive the low speed gear.

7. The reel of claim 1 wherein said key means further comprises a high speed drive portion fixed axially on the gear shaft to rotate therewith juxtaposed with said high speed gear to drive the high speed gear.

8. The reel of claim 7 wherein said high speed drive portion comprises a plurality of lugs fixedly connected to and spaced radially about the gear shaft and the high speed gear has a plurality of bosses fixedly connected to one face thereof and radially spaced from one another thereon to provide a plurality a slots therebetween for engagement with said lugs; whereby said high speed drive portion can drive said high speed gear when said lugs engage said bosses.

9. The invention of claim 8 wherein said slots are wider than the lugs.

10. The invention of claim 9 wherein the bosses have a relieved, stepped-down configuration to permit the lugs to partially enter the slots and then fully enter the slots upon further rotation of the gear shaft.

11. The invention of claim 10 wherein the mating services of the lugs and bosses are in a wedge configuration.

12. The invention of claim 7 wherein said high speed drive gear has a mesh plate attached to one face thereof for rotation therewith; said mesh plate being configured for engagement with said high speed drive portion; whereby said high speed drive portion can drive said high speed gear when said mesh plate is engaged therewith.

13. The invention of claim 7 wherein said low speed drive gear has a mesh plate attached to one face thereof for rotation therewith; said mesh plate being configured for engagement with said low speed drive portion; whereby said low speed drive portion can drive said low speed gear when said mesh plate is engaged therewith.

14. The invention of claim 3 wherein the spring biased plunger means further comprises:

a shift button;

a catch assembly means;
  said catch assembly means comprising a plurality of catch arms spring biased toward one another;
  a catch housing; and
  a retaining plate;

a shift button shaft connected to said shift button; said shift button shaft being biased outwardly so that said button is biased outwardly of the reel;

said shift button shaft having a groove therein for engaging said catch arms to retain said shift button in a depressed inwardly position in said reel;

a shift release assembly means comprising a shift release base and a collar fixed to said shift release base;

handle means comprising a handle and a handle screw; said handle screw having a plurality of bosses extending therefrom;

said catch arms being separated by said bosses which are spring biased to be in engagement therewith, such that upon rotation of said collar, said catch arms cam on said bosses to spread them further apart until they reach a diameter that releases them from engagement with the groove in the shift button shaft, so that the shaft can pass therebetween.

\* \* \* \* \*